US007669908B2

(12) United States Patent
Townson

(10) Patent No.: US 7,669,908 B2
(45) Date of Patent: Mar. 2, 2010

(54) ENDGATE HINGE FOR MOTOR VEHICLE HAVING DUAL PIVOT AXES

(75) Inventor: James M. Townson, Clarkston, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 161 days.

(21) Appl. No.: 12/099,179

(22) Filed: Apr. 8, 2008

(65) Prior Publication Data

US 2009/0250577 A1 Oct. 8, 2009

(51) Int. Cl.
*B62D 33/027* (2006.01)

(52) U.S. Cl. .......................................... 296/51; 49/192

(58) Field of Classification Search .................. 296/51; 49/192

See application file for complete search history.

(56) References Cited

U.S. PATENT DOCUMENTS 3,020,084 A * 2/1962 Sylvester ..................... 296/51
6,938,941 B2 * 9/2005 Thiele et al. .................. 296/50
7,258,373 B2 * 8/2007 Plett et al. ................... 292/210

FOREIGN PATENT DOCUMENTS

DE 19745032 A1 4/1998
DE 202005013033 U1 4/2006

* cited by examiner

*Primary Examiner*—Dennis H Pedder

(57) ABSTRACT

An assembly for opening and closing a cargo opening of a motor vehicle includes first and second posts located at opposite lateral sides of the cargo opening, the second post being spaced laterally from the first post, an endgate able to open and close the cargo opening, and first, second and third brackets, each bracket secured to one of the posts and the endgate, and defining a lateral axis and an upright axis. The first bracket is secured to the first post. The second bracket is secured to the second post such that the lateral axis of the second bracket is aligned with the lateral axis of the first bracket. The third bracket is secured to the first post at an elevation higher than an elevation of the first bracket such that the upright axis of the third bracket is aligned with the upright axis of the first bracket.

9 Claims, 4 Drawing Sheets

ENDGATE HINGE FOR MOTOR VEHICLE HAVING DUAL PIVOT AXES

BACKGROUND OF INVENTION

This invention relates generally to an endgate for a motor vehicle, and, more particularly, to an endgate and hinge assembly that allows the endgate to swing alternately about a lateral axis and an upright axis.

The tailgate at the back of a wagon, truck, or station wagon is usually hinged along a lateral axis at the bottom of the tailgate to pivot downward for convenience in loading or unloading cargo. A door at the back of a vehicle hinged along a lateral axis at the top to open upward is often referred to as a hatch or lift gate.

In certain cases it is helpful and preferred that the vehicle have an endgate that can swing like a door about a vertical axis to facilitate access to the cargo area.

A more recent need exists in the automotive industry for a hinge assembly that supports an endgate such that the gate can swing both about a lateral axis and, like a door, about a upright axis at the option of the user. Each hinge for this multiple purpose should be substantially identical, easily installed, occupy a small space and available at low cost.

SUMMARY OF INVENTION

An assembly for opening and closing a passageway into the body of a motor vehicle includes an endgate for opening and closing the passageway and several brackets, each bracket being secured to the endgate and body and defining a lateral axis and an upright axis. The first bracket is secured to the body at a first lateral side of the passageway. The second bracket is secured to the body at a second lateral side of the passageway opposite the first side such that the lateral axis of the second bracket is aligned with the lateral axis of the first bracket. The third bracket is secured to the body at the first lateral side and at an elevation spaced from an elevation of the first bracket such that the upright axis of the third bracket is aligned with the upright axis of the first bracket.

Each bracket includes a body-side strap for securing the bracket to the body, a first pivot pin supported on the body-side strap and aligned with the respective lateral axis, a gate-side strap for securing the bracket to the endgate, and a second pivot pin secured to the body-side strap and aligned with the respective upright axis.

The first pivot pin supports the gate-side strap for rotation about the lateral axis, either upward or downward. The second pivot pin supports the gate-side strap for rotation about the upright axis.

The assembly provides dual axis hinging having minimum weight and low cost. It enables the endgate to be removed from its assembled position on the vehicle with the use of simple tools.

The endgate with the brackets can be installed in the vehicle prior to paint shop operations and set dimensionally in the body shop of the assembly center, thereby avoiding the need to provide for additional corrosion protection.

An embodiment contemplates a method for reliably restricting the angular range of door travel on a vehicle such that contact between the door and a specialized, unusually wide vehicle body is prevented.

DETAILED DESCRIPTION

Figure 1:
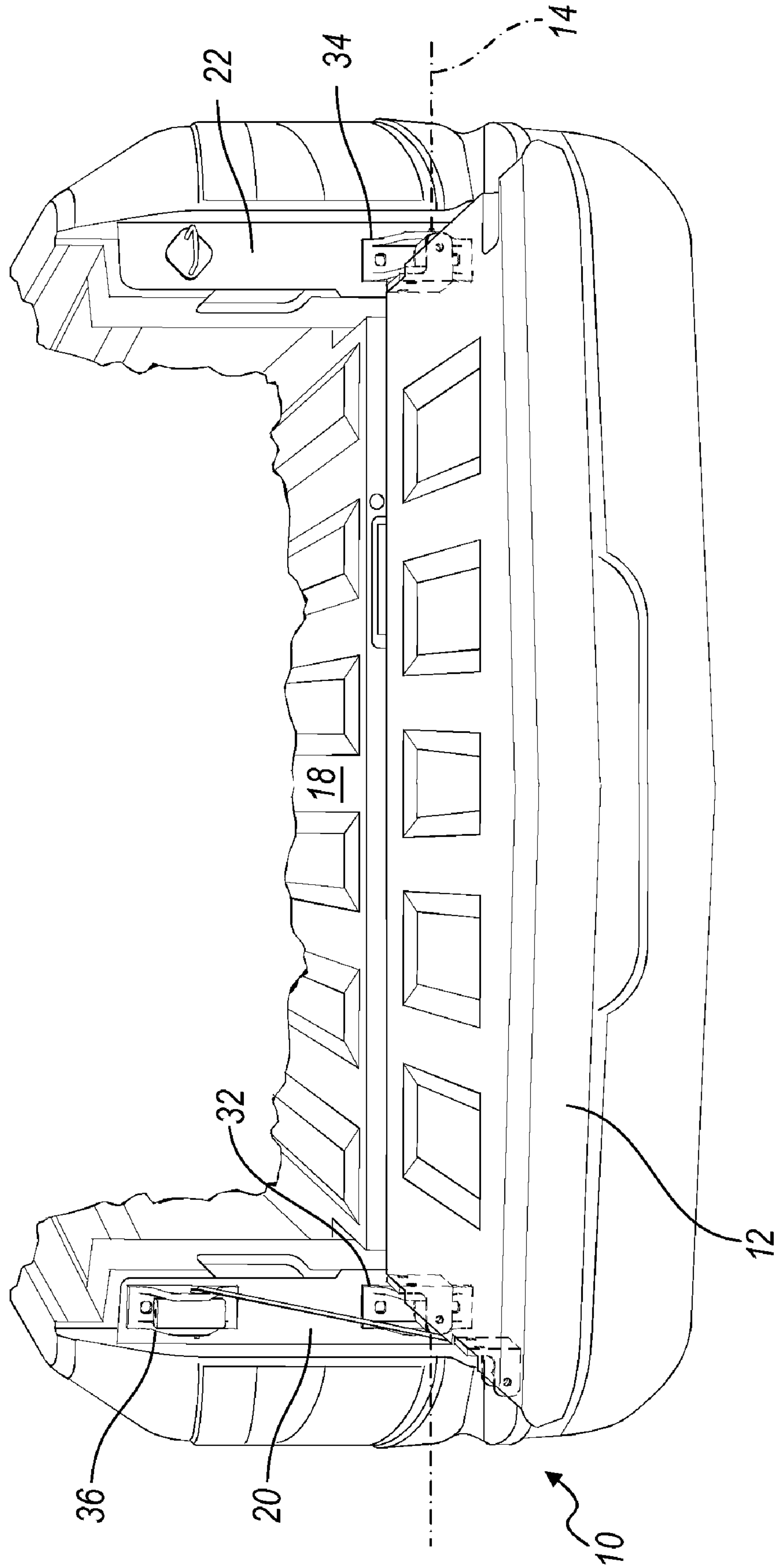
FIG. 1 is a rear view of a pickup truck showing the endgate opened about a lateral axis.
Figure 2:
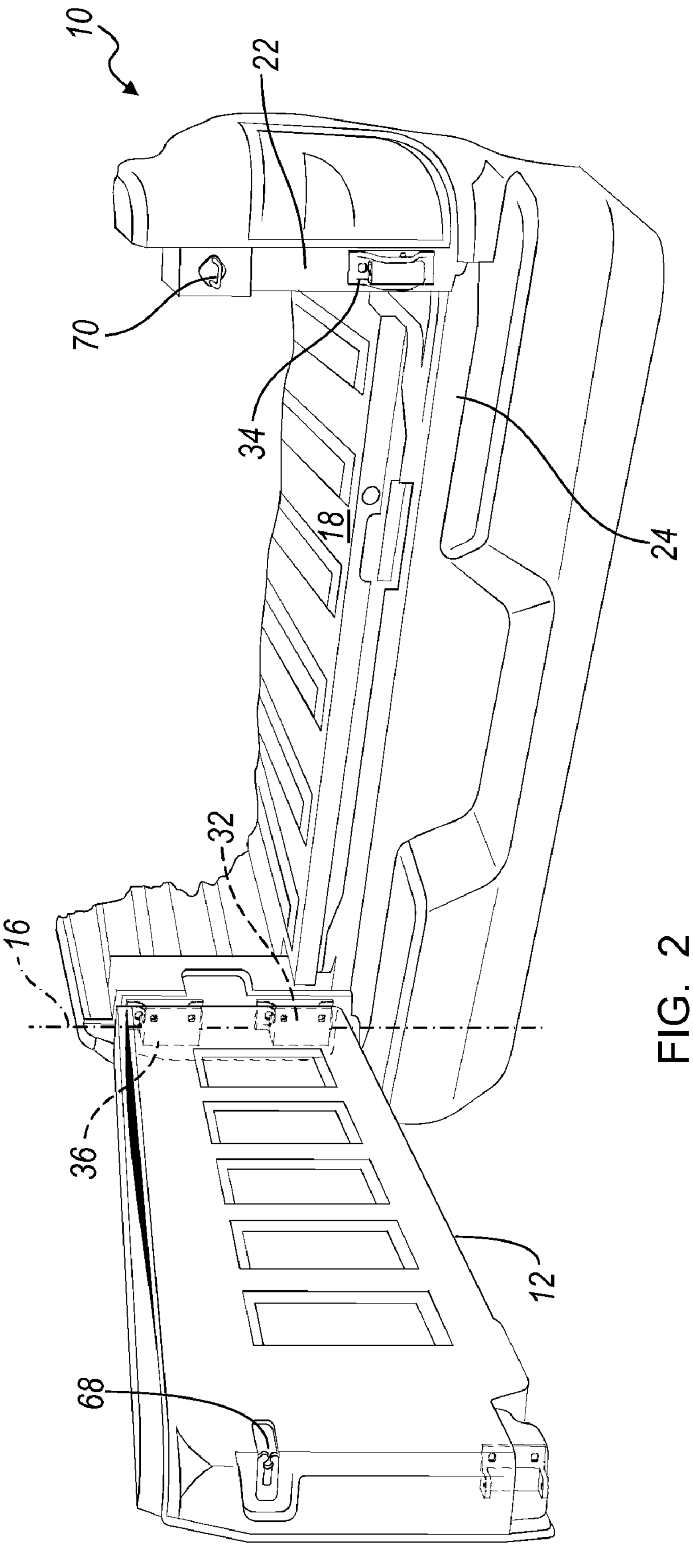
FIG. 2 is a rear view of the pickup truck showing the endgate opened about an upright axis.

Referring now to the drawings, there is illustrated in FIGS. 1 and 2 a pickup truck 10 whose endgate 12 is hinged both at a lateral axis 14 and an upright axis 16 for opening and closing access to the truck bed 18. The cargo opening is formed with a left-side post 20, a right-side post 22, and a rail interconnecting the posts 20, 22. Preferably, axis 14 is horizontal and axis 16 is vertical, although they may be skewed with respect to the horizontal and vertical planes.

Figure 3:
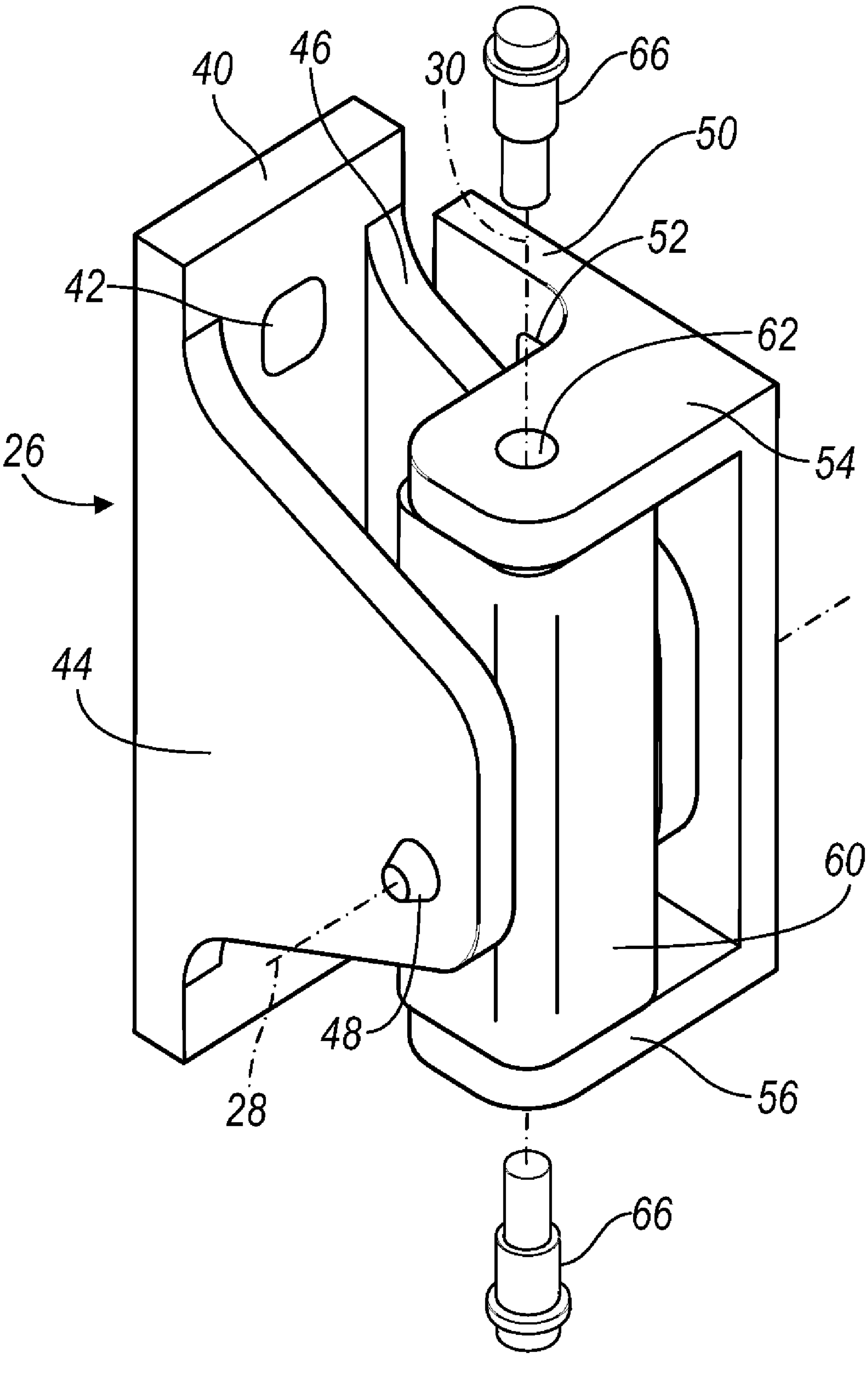
FIG. 3 is a perspective view of an endgate gimbal bracket in a closed position.
Figure 4:
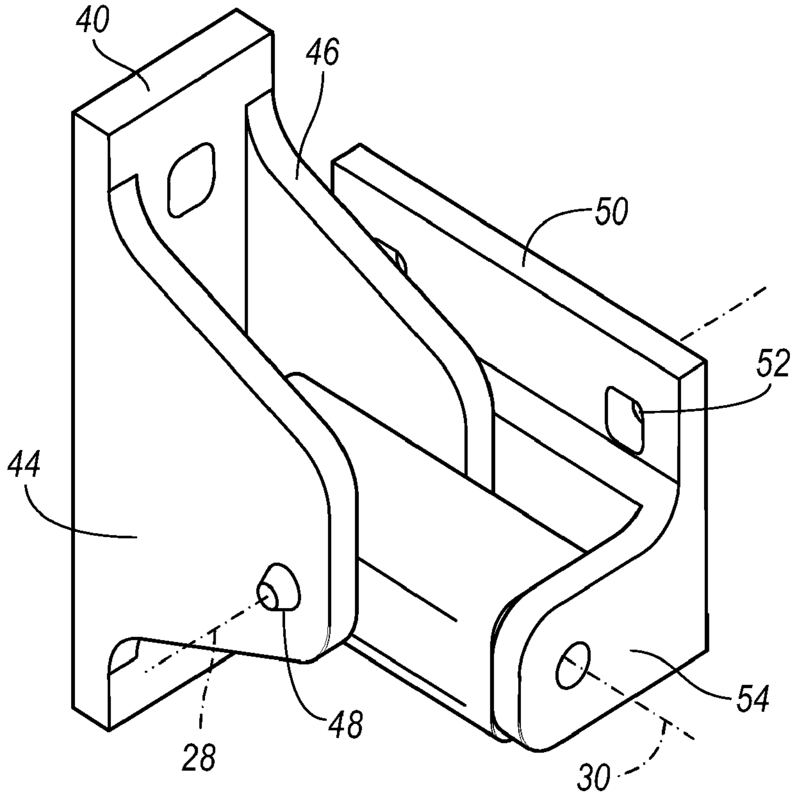
FIG. 4 is a perspective view of an endgate gimbal bracket showing the gate-side strap pivoted about the lateral axis to an open position.
Figure 5:
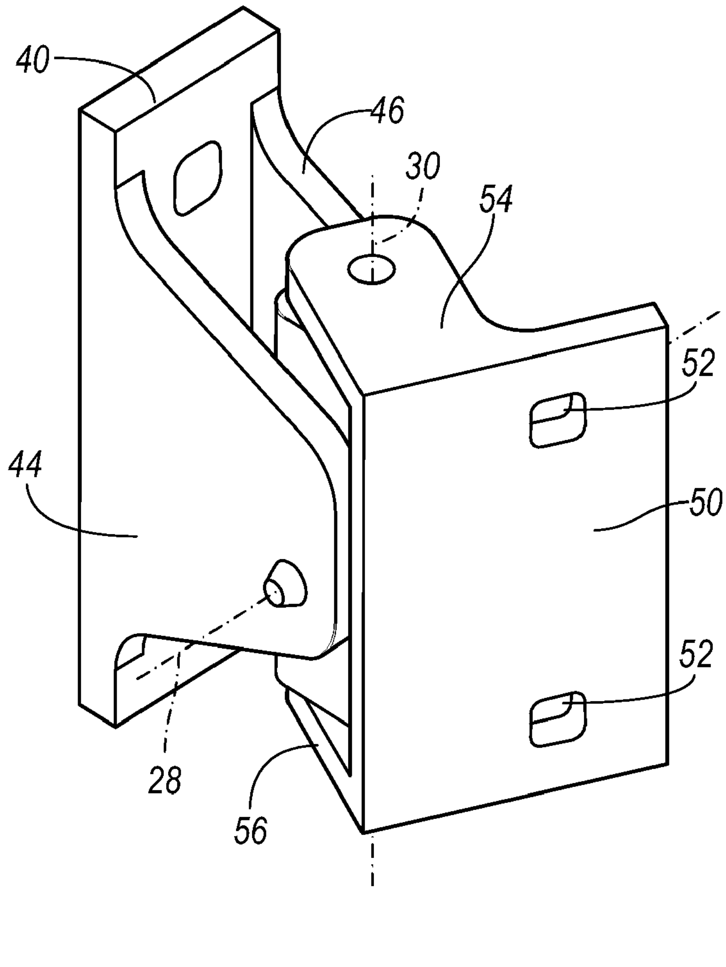
FIG. 5 is a perspective view of an endgate gimbal bracket showing the gate-side strap pivoted about the upright axis to an open position.

As shown in FIG. 3, each endgate gimbal bracket 26 includes a horizontal pivot axis 28 and a vertical pivot axis 30. The endgate 12 is supported on the vehicle 10 by a first gimbal bracket 32, which is secured to the left-side post 20, a second bracket 34, which is secured to the right-side post 22, and a third gimbal bracket 36, which is secured to the left-hand post 20 and is located at a higher elevation than that of bracket 32. Axis 28 of bracket 32 and axis 28 of bracket 34 are mutually aligned and coaxial with lateral axis 14. Axis 30 of bracket 32 and axis 30 of bracket 36 are mutually aligned and coaxial with upright axis 16.

Each endgate gimbal bracket 26 includes a body-side strap 40, formed with attachment holes 42 for removeably securing the body-side strap 40 to the posts 20, 22, and lugs 44, 46, which are mutually parallel and extend rearward from strap 40. A first pivot pin 48, aligned with axis 28, is supported on lugs 44, 46. Each endgate gimbal bracket 26 further includes a gate-side strap 50, formed with attachment holes 52 for securing the strap 50 to the endgate 12, and lugs 54, 56, which are mutually parallel and extend laterally from strap 50. A second pivot pin 60, in the form of a knurled shoulder pin having a square cross section and flat sides, is fitted between and in contact with lugs 44, 46, thereby preventing pin 60 from rotating due to contact with lugs 44, 46. Pin 60 is secured to the gate-side strap 50 by shoulder bolts 66, which are inserted into holes 62 formed in lugs 54, 56 and engage screw threads formed in pin 60. Pin 60 supports gate-side strap 50 as it pivots on body-side strap 40 about axis 28 and as it pivots on body-side strap 40 about axis 30.

A latch 68, secured to the endgate 12, engages a striker 70, located on post 22, thereby securing the endgate in a closed position and preventing its pivoting about axes 14, 16.

In operation, endgate 12 swings about axis 14 to the open position shown in FIG. 1 as the gate-side straps 50 of brackets 32, 34 pivot about axis 28 on the respective body-side straps 40. When the endgate pivots about axis 14, either shoulder bolts 66 are removed from bracket 36, or bracket 36 is disconnected from the endgate 12 by removing the attachments at holes 52. Endgate 12 swings about axis 16 to the open position shown in FIG. 2 as the gate-side straps 50 of brackets 32, 36 pivot about axis 30 on the respective body-side straps. When the endgate pivots about axis 16, either pivot pin 48 is removed from bracket 34, or bracket 34 is disconnected from the endgate by removing the attachments at holes 52.

The brackets 32, 34, 36 assembled as shown in FIG. 3 are shipped to an assembly plant where they are installed and secured to the endgate 12 in a body shop. Oversized holes are used at all hinge attachment locations to ensure their ability to properly set the relationship of the endgate 12 to the rear cargo opening. If the endgate 12 must be removed for service or to accommodate heavy loading conditions, shoulder bolts 66 are removed from engagement with pin 60 with simple tools and the endgate 12 is separated from the vehicle 10. The body-side straps 40 would remain secured to the vehicle body.

Although the term "endgate" has been used in this description, the invention is applicable also to a tailgate hinged at the top to open downward, to a lift gate or hatch hinged at the top to open upward, and to a door hinged at the side for convenience in loading or unloading cargo.

While certain embodiments of the present invention have been described in detail, those familiar with the art to which this invention relates will recognize various alternative designs and embodiments for practicing the invention as defined by the following claims.

What is claimed is:

1. An assembly for opening and closing a cargo opening of a motor vehicle comprising:

a first post;

a second post spaced laterally from the first post, the posts being located at opposite lateral sides of the cargo opening;

an endgate able to open and close the cargo opening; and first, second and third brackets, each bracket secured to one of the posts and able to be secured to the endgate, and defining a lateral axis and an upright axis, the first bracket being secured to the first post, the second bracket being secured to the second post such that the lateral axis of the second bracket is aligned with the lateral axis of the first bracket, and the third bracket being secured to the first post at an elevation higher than an elevation of the first bracket such that the upright axis of the third bracket is aligned with the upright axis of the first bracket, each bracket including a body-side strap for securing the bracket to one of the posts, first lugs that extend from the body-side strap, a first pivot pin supported on the first lugs and aligned with the respective lateral axis, a gate-side strap for securing the bracket to the endgate, second lugs that extend laterally from the gate-side strap, and a second pivot pin supported on the second lugs and aligned with the respective upright axis, the first pivot pin passing through the second pivot pin, the second pivot pin being prevented from rotating due to contact with the first lugs.

2. The assembly of claim 1, wherein each lateral axis is located in a horizontal pane, and each upright axis is in located a vertical plane.

3. The assembly of claim 1, wherein a shank of the second pivot pin is formed with parallel planes fitted between and contacting the first lugs.

4. The assembly of claim 1, further comprising:

a latch secured to the endgate; and a striker located on one of the posts for engagement by the latch, said engagement securing the endgate in a closed position and preventing pivoting of the endgate about the lateral axis and the upright axis.

5. An assembly for opening and closing a passageway into the body of a motor vehicle comprising:

an endgate for opening and closing the passageway; and first, second and third brackets, each bracket secured to the endgate and defining a lateral axis and an upright axis, the first bracket being secured to the body at a first lateral side of the passageway, the second bracket being secured to the body at a second lateral side of the passageway opposite the first side such that the lateral axis of the second bracket is aligned with the lateral axis of the first bracket, and the third bracket being secured to the body at the first lateral side and at an elevation spaced from an elevation of the first bracket such that the upright axis of the third bracket is aligned with the upright axis of the first bracket, each bracket including a body-side strap for securing the bracket to the body, first lugs secured to the body-side strap, a first pivot pin secured to the first lugs and aligned with the respective lateral axis, a gate-side strap for securing the bracket to the endgate, second lugs secured to the gate-side strap, and a second pivot pin aligned with the respective upright axis, intersecting the first pivot pin, supporting the gate-side strap for rotation about the upright axis, and prevented from rotating due to contact with the first lugs.

6. The assembly of claim 5, wherein each lateral axis is located in a horizontal pane, and each upright axis is located in a vertical plane.

7. The assembly of claim 5, wherein the first pivot pin supports the gate-side strap for rotation about the lateral axis.

8. The assembly of claim 5, wherein a shank of the second pivot pin is formed with parallel planes fitted between and contacting the first lugs.

9. The assembly of claim 5, further comprising:

a latch secured to the endgate; and a striker located on the body for engagement by the latch, said engagement securing the endgate in a closed position and preventing pivoting of the endgate about the lateral axis and the upright axis.

* * * * *